Aug. 24, 1965    C. L. FARRAND    3,202,948
PRECISION TRANSDUCER
Filed Nov. 10, 1959    4 Sheets-Sheet 1

INVENTOR
CLAIR L. FARRAND
BY W E Beatty
ATTORNEY

Aug. 24, 1965

C. L. FARRAND 3,202,948

PRECISION TRANSDUCER

Filed Nov. 10, 1959

INVENTOR
CLAIR L. FARRAND
BY W.E.Beatty
ATTORNEY

Aug. 24, 1965
C. L. FARRAND
3,202,948
PRECISION TRANSDUCER
Filed Nov. 10, 1959
4 Sheets-Sheet 3
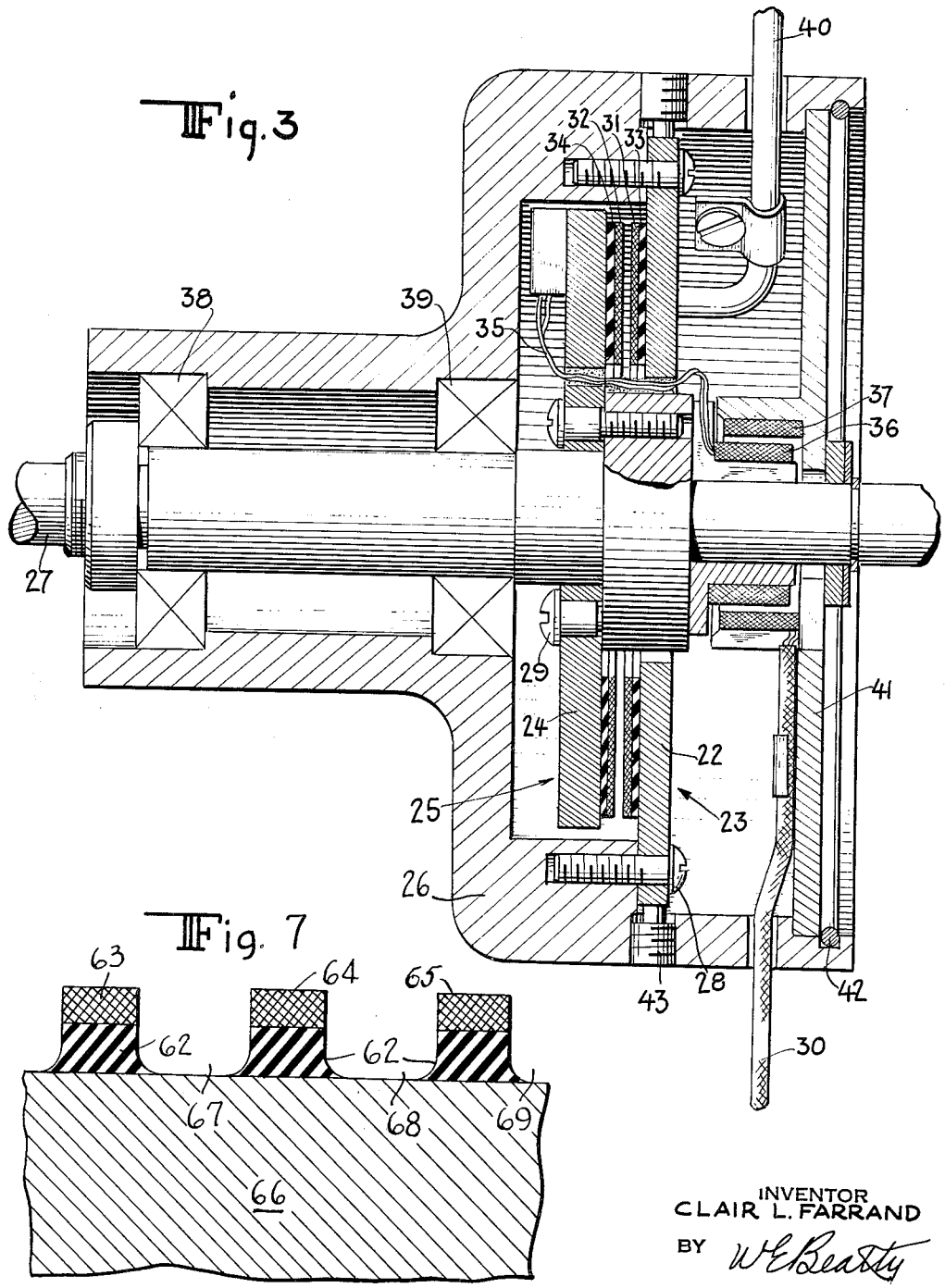
INVENTOR
CLAIR L. FARRAND
BY W. E. Beatty
ATTORNEY Aug. 24, 1965  C. L. FARRAND  3,202,948
PRECISION TRANSDUCER
Filed Nov. 10, 1959  4 Sheets-Sheet 4
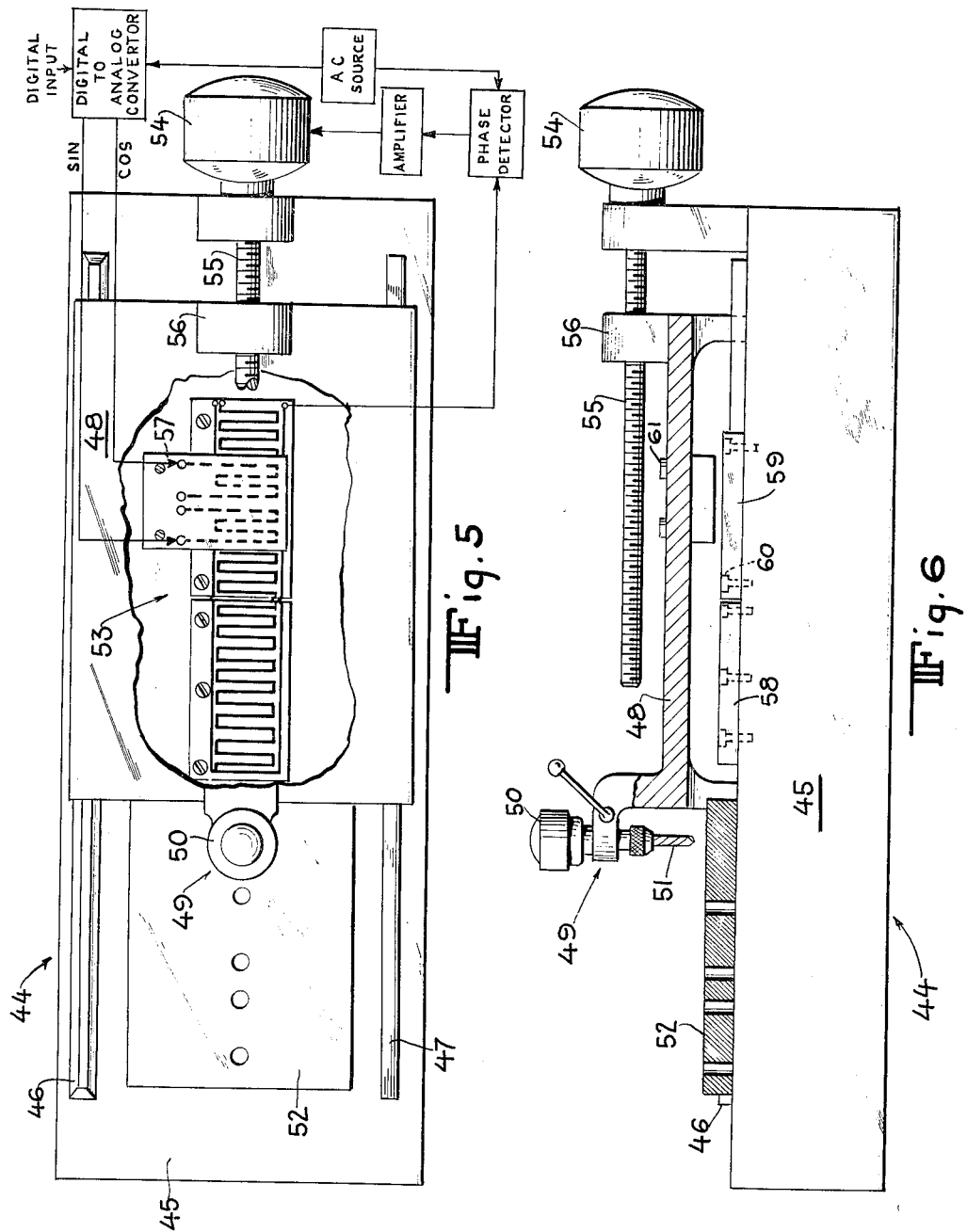
INVENTOR
CLAIR L. FARRAND
BY
W. E. Beatty
ATTORNEY

United States Patent Office 3,202,948
Patented Aug. 24, 1965

3,202,948
PRECISION TRANSDUCER
Clair L. Farrand, Bronxville, N.Y., assignor to Inductosyn Corporation, Carson City, Nev., a corporation of Nevada
Filed Nov. 10, 1959, Ser. No. 852,028
6 Claims. (Cl. 336—115)

This invention relates to improvements in the construction, composition and methods of making precision electrical position measuring transformer apparatus and of the types described in United States Patent No. 2,799,-835 wherein primary and secondary windings each comprising a multiplicity of series-connected conductors are arranged on the adjacent faces of relatively movable members of insulating material.

The principal objects of the invention are to provide precision position measuring transformers of relatively high accuracy and having greatly improved mechanical and structural characteristics, predetermined overall thermal coefficient of expansion (and contraction) for compatibility with associated structures, and an electrical performance of such excellence as to assure that the wave of inductive coupling, interlinking the conductor windings, is effectively sinusoidal in terms of milliradians of the coupling cycle ($2\pi$ radians); one milliradian equals one-thousandth part, one-tenth percent, of the maximum magnetic flux inductively interlinking the conductor windings.

The prior art emphasizes that for many reasons the magnetic circuits of precision position measuring transformers for either rotary or linear position measurement, and of the type having relatively movable flat members supporting the windings on their adjacent faces should include only air paths. United States Patent No. 2,650,-352 explains that for the measurement of linear distances or angles two relatively movable windings each having a large number of series-connected conductors should be mounted on relatively movable member supports or bases of non-magnetic and insulating material, preferably glass, and that the thin flat conductor windings thereon may be a metallized deposit made directly on the glass support or base member, so that the magnetic circuits include only effective air paths. Patent No. 2,799,835 after pointing out that either ferromagnetic or air-core transformers can be used in the prior devices, proceeds to recommend, illustrate and describe only non-ferromagnetic and non-conducting material such as glass having plane faces, as a support or base for the winding conductors which are laid down directly on the glass in the form of a metallic deposit, preferably silver, by a photo-etching process.

The prior art also recognized the necessity for compensating for undesired thermal expansion of the frame or bed of an automatically controlled machine tool in which a linear position measuring transformer of the type described in said Patent No. 2,799,835 is employed in the coordinate system for guiding and positioning the cutting tool. British Patent No. 810,105 (published March 11, 1959) points out that when an automatic machine operation is carried out with machine tools having frames or beds usually of cast iron or cast steel, at a higher ambient temperature than that at which the coordinate system was referenced or established, the workpiece will be cut to wrong dimensions by virtue of the thermal expansion of the machine tool frame or bed itself. The British patent also states that as the frame of the machine tool expands and contracts it carries with it in general the physical elements of the coordinate system which include the member of the position measuring transformer affixed to the frame or bed. It warns that the insulating material of which the said member is made should be selected so as to have substantially the same temperature coefficient of expansion as that of the metal of the machine tool bed or frame. This is a requirement that is difficult, if not impossible to meet, at least economically. The materials desired to be employed from a practical standpoint do not have the same temperature coefficient of expansion. It has been found necessary to determine the temperature coefficients of expansion of the materials of interest within the range of ambient temperature variations. They are found in many cases to be substantially different from the published values.

In actual practice to date the precision position measuring transformers of the said type of Patent No. 2,799,-835 for measuring linear and rotary motions have been constructed with their winding conductor arrays mounted or deposited directly on support or base members of non-conducting, non-magnetically permeable materials such as glass and other non-magnetic insulators despite the fact that under variable ambient temperature conditions the thermal expansion or contraction of the said members and the windings thereon was substantially different from the thermal expansion, or contraction, of the metal structure on which the members were mounted.

It has been determined that when a linear measuring transformer member having its conductor windings directly deposited on a base or support of glass, which glass had a temperature coefficient of $4.9 \times 10^{-6}$ inches, per inch, per degree Fahrenheit, is affixed to a frame of iron having a temperature coefficient of $5.9 \times 10^{-6}$ inches, per inch, per degree of Fahrenheit, while yielding correct measurements at an established temperature of 68° Fahrenheit, the glass member (and windings) had at 80° Fahrenheit, a total length error with respect to the frame of one and two-tenths ten-thousandths of an inch (0.00012"). Such errors cannot be tolerated when an overall positional accuracy of the machine tool, including the control equipment, of one ten-thousandths inch (0.0001") is required, and only a fraction of this can be apportioned to the measuring system.

In the case of rotary position measuring transformers the problem of centering the winding conductor arrays with the axis of rotation is very acute. The difficulties generally are described in United States Patent No. 2,844,802, where the stationary member winding conductor base or support is of a material having a different temperature coefficient of expansion from that of the housing cannot be secured directly to it and still have the member and winding accurately maintain its central position without the employment of elaborate and costly expedients, such as intermediary compensating supporting members. The same is true in respect of a rotary member having a different temperature coefficient of expansion from that of the rotating support on which it is mounted.

I have discovered, contrary to the prior practices and teachings including the admonitions contained in said Patents Nos. 2,650,352 and 2,799,835, that precision position measuring transformers for measuring rotary and linear positions with high accuracy may have the bases of their relatively movable members massively and rigidly constructed of metal of high electrical conductivity and magnetic permeability, or both; and that the conductor arrays may be secured to the bases in close and intimate relation therewith, without interfering with the precise form of the coupling wave necessary for their successful operation and providing a transformer structure having the identical temperature coefficient of expansion as the machine to which it is attached, thereby avoiding the difficulties heretofore experienced in the art. In some cases the advantages of an increased transformation ratio are obtained. Metal is to be understood to mean herein to also include, in addition to the usual metals, such solid (homogeneous) materials which may have been initially a powder thereafter compressed and sintered, as by the practices of powder metallurgy, and exhibiting electrical conductivity, or magnetic permeability, or both, and including the ferrites.

In accordance with the invention, the flat relatively movable members which support the winding conductors may be of iron, steel, aluminum, brass, magnesium, titanium, ferrites and powdered metals and metals compressed and sintered by powder metallurgy methods.

Thus, the invention enables the construction of position measuring transformers having in general the physical properties of metal, and importantly a position measuring transformer of metal that possesses a temperature coefficient of expansion substantially identical to that of the metal frame, bed or carriage to which it is to be affixed or that of the housing and members to which it is affixed and in which it is to operate under varying ambient temperatures. In other words, the transformer may be made compatible and compliant with the machinery with which it is to operate.

In accordance with the invention, the array of winding conductors may be formed from a thin continuous sheet of metal of good electrical conductivity and having ductility such as copper, aluminum, silver, etc. The thickness dimension of the conductor sheet is selected so the proper electrical conductivity for the winding array is attained. The conductor sheet is affixed to the base member of metal by a very thin bond or film of insulating material in accordance with the invention. Depending upon the bonding material selected, its thickness may range between .001 inch and .010 inch. Importantly the winding array shall be capable of expanding and contracting with the metal base without the bond cracking or becoming detached from the base or the conductor sheet from the bonding film, under substantially wide variations in ambient temperature. Ambient temperatures may generally vary for machine tool work from 60 to 90 degrees Fahrenheit. Much greater variations are to be experienced in connection with missiles and may range from sub-zero to approaching incandescence.

Materials suitable for insulating and bonding the thin metal sheet and the base or support metal block or disc have in general temperature coefficients of expansion which are widely different or many times that of metals to be employed for the electrically conductive sheet ultimately to form the winding arrays and that of the base or support for the winding conductors, respectively. Thus, depending upon the particular bonding material to be employed, if the thickness of the bonding layer is excessive, it will tend to expand and contract the length of the conductor array in accordance with its own characteristic and not as desired in accordance with the characteristic of the metal base or support. Consequently, the thinness of the bonding layer, its temperature coefficient of expansion, elasticity and adhesion to the base and to the sheet are severally and jointly of importance in accordance with the invention.

The minute effects of the various factors upon the sinusoidal shape of the coupling wave, within .1 percent, can be determined by very precise measurements. These can be made first by measuring the voltage output of the transducer at a large number of precise positions through the cycle, step by step, for approximately a hundred positions. This calibrated transducer may then be used as a standard. The standard transducer may be directly mechanically coupled to the transducer to be tested and by suitable electrical arrangements the difference, i.e., error curve, between the two coupling waves may be recorded. It is convenient to introduce a correction for the error of the standard transducer so that the error of the unknown transducer, at a standard temperature of 68° F., will be in true microinches of length for linear transducers or seconds of arc for rotary transducers.

The error curve within the one-tenth inch cycle of a former precise linear transducer is shown as curve $a$ in FIG. 4. This is an error curve of departure of the shape of the coupling wave from a true sine. The transformation ratio of this transducer is .005. The frequency of the applied voltage is 10 kilocycles for all curves.

The former linear transducer of the measurement shown on curve $a$ in FIG. 4 comprised a stationary member ten inches in length, of glass four-tenths inch thick and 2.5 inches wide having a single winding of two hundred transverse conductors serially connected. Each conductor is thirty-three thousandths inch in width and a space of seventeen thousandths inch between conductors. The conductors are of metal 1.6 inches long and one thousandth in thickness. The movable member comprised two windings each of thirty-two transverse conductors serially connected. One of the two windings was displaced from the other by a quarter of a space cycle, i.e., twenty-five thousandths of an inch. The conductors of the movable winding were mounted on a glass base 4.75 inches by 2.87 inches and four-tenths inch thick. An air gap space of one-hundredth of an inch was maintained between the conductors of the relatively movable members throughout the range of motion.

The effects upon the accuracy of the sinusoidal shape of the coupling wave and of the magnitude of the coupling coefficient between the relatively movable windings will now be described in connection with certain transducers which are constructed in accordance with this invention.

In one form of the invention, a transducer was constructed of the dimensions described above, having a metal base for the stationary member of hot rolled steel and a conductor array of copper .002 inch thick and insulated therefrom and bonded thereto by a layer of polyamide cured epoxy resin and smooth absorbent tissue paper two-thousandths of an inch thick, making a total thickness of the bond and separation of the conductors from the base of .005 inch. The movable member was the same as used for curve $a$. The errors of departure from sinusoidal shape of its coupling wave attributable to the material of the base are shown by curve $b$, FIG. 4.

In FIG. 4, the abscissa represents cycles of the coupling wave; in this case one cycle equals .100 inch in length. The ordinates represent the departure of the coupling wave from sinusoidal shape as an error of position in micro-inches. The transducer of curve $a$ was designed to have an error of less than plus or minus 50 micro-inches, i.e., 3 milliradians. Thus, a transducer having an error not exceeding this value may be considered to have a coupling wave that does not depart sensibly from sinusoidal shape.

It can be seen from curve $b$ that with the metallic and magnetically permeable fixed base spaced .005 inch from the conductor array, the sinusoidal shape of the coupling wave has not been sensibly departed from. The hot rolled steel base of the fixed member has improved the amplitude of the coupling wave by sixty percent, by the increase in transformation ratio to a value of .008.

Curve $c$ shows the case where the bases of both the fixed member and the movable member are made of hot rolled steel and the conductor arrays of each member spaced .005 inch from their respective bases. It can be seen that the sinusoidal shape of the coupling wave has not been sensibly departed from. However, the transformation ratio has been increased to .02.

Curve $d$ shows the case when the bases of both the fixed member and the movable member are made of commercial sheet aluminum and the conductor arrays of each member are spaced .005 inch from their respective bases. It can be seen that the sinusoidal shape of the coupling wave has not been sensibly departed from. The transformation ratio for this case is .0045.

It has thus been shown that it is feasible to use base materials for one or both of the relatively movable members of ferromagnetic or non-ferromagnetic metal so that the thermal expansion of the base can be made to correspond to the thermal expansion of the metal upon which the member is mounted.

For further details of the invention, reference is made to the following drawings wherein:

FIG. 3 is a sectional view of a rotary transducer according to the invention;

FIG. 5 is a plan view of a machine tool to which the present invention is applied with parts broken away;

FIG. 6 is a view in side elevation of the machine tool of FIG. 5;

FIG. 7 is an enlarged fragmentary longitudinal sectional view through a transducer member of FIGS. 5 and 6, with parts broken away.

Figure 1:
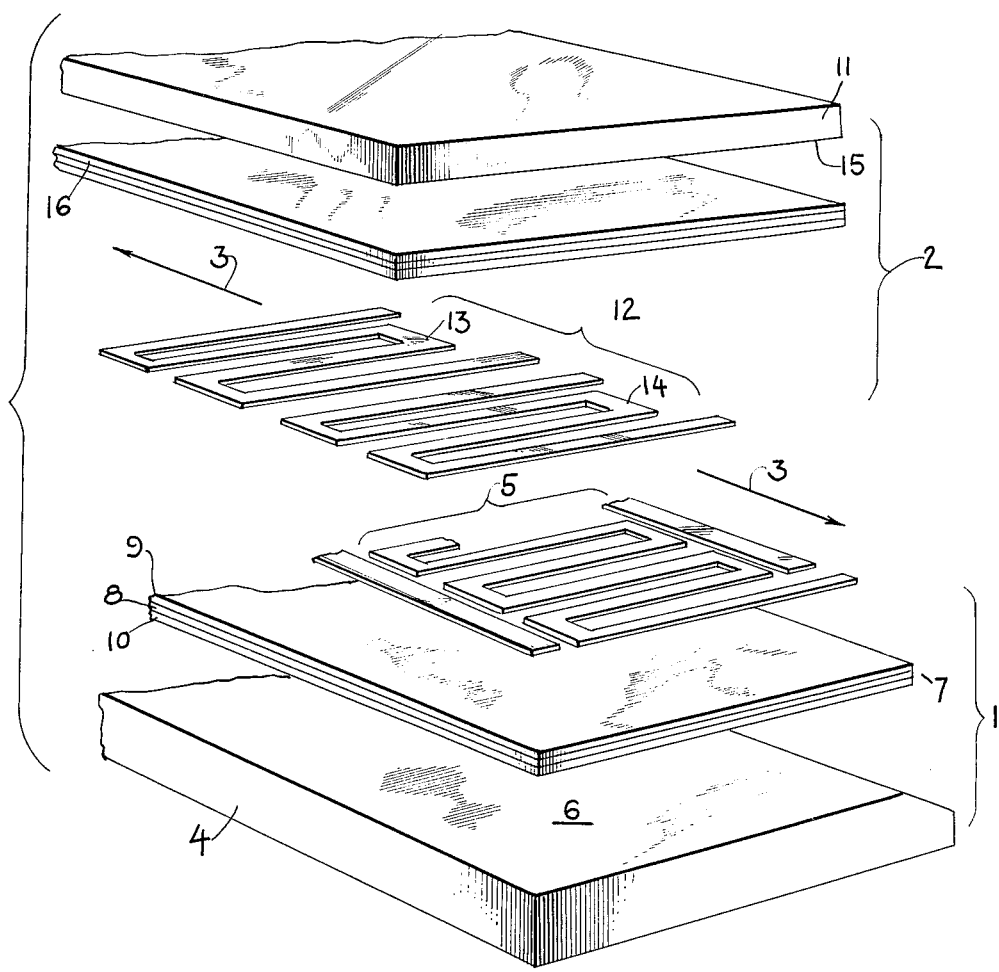
FIG. 1 is an exploded perspective view of a transducer in accordance with the invention.

In FIG. 1, the transducer is a position measuring transformer having relatively movable members, a fixed member 1 and a member 2 movable in the directions indicated by the arrows 3. The fixed member 1 has a base 4 of hot rolled steel. Insulated from this base 4 and bonded to it is a transformer winding composed of a sheet of conductors indicated at 5 in the form of conductors arranged transverse to the direction of motion and serially connected. The transformer member constituted by the conductor sheet 5 is bonded to and insulated from the flat surface 6 of base 4 by means of a bonding material generally indicated at 7. As illustrated, the bonding material 7 is indicated as comprising an intervening sheet 8 of insulating paper approximately two thousandths of an inch thick having on opposite sides thereof and permeated by coatings 9 and 10 of polyamide cured epoxy resin. The movable member 2 has a base 11 of hot rolled steel similar to base 4. Insulated from this base 11 and bonded to it is the other transformer winding in the form of a sheet of conductors indicated at 12 in the form of conductors arranged transverse to the direction of motion and divided into two groups of windings 13 and 14. The conductors of each group are serially connected. Windings 13 and 14 are in space quadrature relation. The conductor sheet 12 is bonded to and insulated from the flat surface 15 of base 11 by means of material generally indicated by 16, and similar to the bonding material 7 indicated above.

The members 1 and 2 of the transducer are similarly made as follows, the description referring to member 1 but applying equally to member 2.

Figure 2:
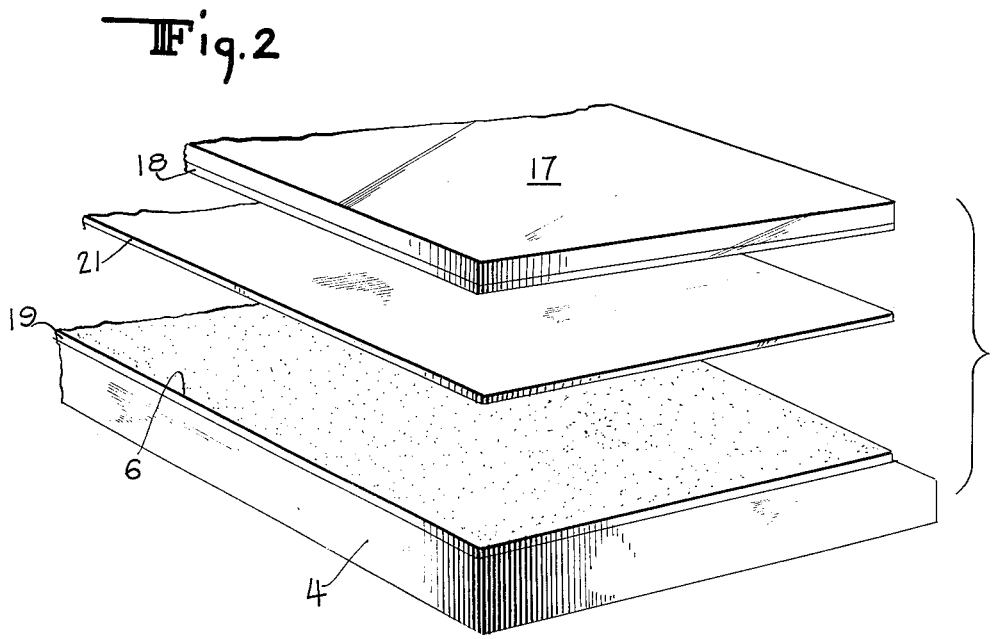
FIG. 2 is an exploded perspective view of elements used in the process of making the transducer of FIG. 1.
Figure 4:
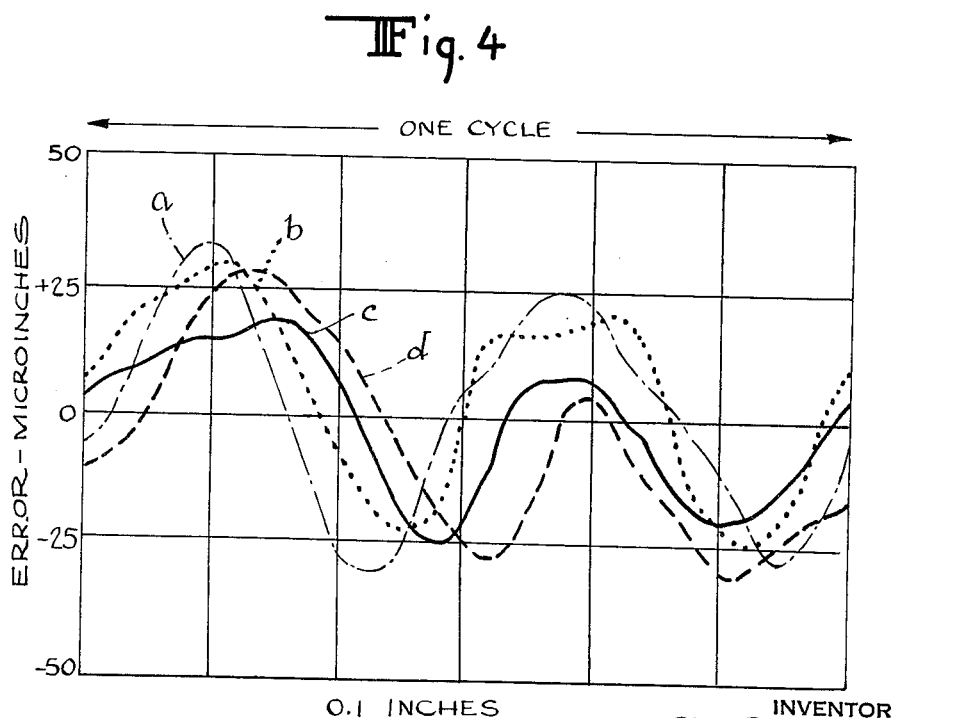
FIG. 4 is a graph useful in explaining the invention.

Referring to FIG. 2, the electrically conducting sheet 17 of copper, silver aluminum or the like which may be, for example, two thousands of an inch in thickness, is coated on the underface with a layer 18 of polymerizing liquid resin. Similarly, the surface 6 of base 4 is coated on its upper face with a layer 19 of similar resin. The reference number 21 indicates a layer of paper as described in connection with paper 8 in FIG. 1 coated on both sides with similar resin. The surface 6, paper 21 and conducting sheet 17 thus coated are superimposed as shown in FIG. 2 and pressed together and subjected to heat at the polymerizing temperature. When the polymerizing cycle has been completed, the elements 6, 21 and 17 are thus bonded together. The effect of the paper and resin is to provide an insulating bond like 18 and 19 which separates the conducting sheet 17 from the metallic base 4 approximately five thousands of an inch. The conductor pattern of FIG. 1 is now formed in sheet 17 by photoetching from an accurate master. While chemical setting resins have been described, other bonding means such as thermal setting resins or others may be used provided they have suitable characteristics as described herein. The bond between elements 6 and 17 may be of the order of .001 to .010 inch thick. Alternatively, the layers of resin 18 and 19 may be partially polymerized to a solid state and a layer of liquid resin substituted for paper 21 and a suitable insulating bonding layer produced.

Rotary transducers are subject to a variety of uses. They may be used with machine tools and made of cast iron or steel or may be incorpoarted as a part of the guidance system of a missile and made of lightweight metal such as aluminum, magnesium, titanium, or in some cases, of stainless steel. For each of such uses, a particular metal is appropriate for the casing and rotating member and the same metal should be used for the bases of the stator and rotor members. FIG. 3 shows a rotary transducer employing the invention wherein the base 22 of the fixed member 23 and the base 24 of the rotary member 25 are the same material as that chosen for the casing 26 and the rotary shaft 27 as explained above. The bases 22 and 24 are fastened directly to the casing 26 and rotary shaft 27 respectively by means of bolts like 28 and 29. The sheets of conductors 31 and 32 each constitutes a transformer winding and are insulated from and bonded to bases 22 and 24 respectively by bonds 33 and 34 in accordance with the invention as described in connection with the conductors 5 and 12 of FIG. 1. The leads 35 from the rotary transducer winding 32 are connected to the rotary transformer winding 36 coupled to the fixed transformer winding 37 having leads 30. The purpose of the rotary transformer is to avoid the use of slip rings and brushes. The rotary shaft 27 is mounted in casing 26 on bearings 38 and 39. The fixed transformer windings 31 comprise two windings in space quadrature, corresponding in rotary form to the space quadrature windings 13 and 14 of FIG. 1 and are provided with connecting leads 40. The fixed winding of the rotary transformer is mounted on plate 41 secured by split ring 42. The rotary winding 32 corresponds in rotary form to the fixed winding 5 of FIG. 1. Four screws 43 are provided for centering adjustment of the fixed member 23.

The members are mechanically secured directly and firmly respectively to the housing and shaft and are not subject to shift in concentric position due to thermal expansion and shock and mechanical shock and vibration. Likewise, the sheets of conductor arrays are firmly secured to the bases and maintain a relaxed condition under the above circumstances. In this way, a transducer of great accuracy and stability is provided.

Referring to FIGS. 5 and 6, the machine tool 44 has a bed 45 having ways 46 and 47 on which a carriage 48 is mounted. Carriage 48 has a drill head 49 including a motor 50 for driving a drill 51 to drill holes in a workpiece 52. The position of the carriage 48 and the drill 51 are accurately controlled by the precision transducer indicated at 53, motor 54, screw 55 engaging in nut 56 with digital-to-analog conrtolled servosystem not shown. The transducer 53 comprises one movable member like No. 2 in FIG. 1 and indicated at 57 with a plurality of fixed members like No. 1 in FIG. 1 here shown as two members 58 and 59 arranged end to end and in sufficient number to accommodate the length of travel of the carriage.

The bed 45 and the carriage 48 of the machine tool 44 are in this case assumed to be of iron and the workpiece 52 is likewise assumed to be of iron. In carrying out the present invention to its greatest accuracy and for the reasons explained in connection with FIG. 3, the bases like 4 and 11 of FIG. 3, for the members 57, 58 and 59 are made of iron as explained in connection with FIG. 1. The fixed members 58 and 59 are directly secured to the bed 45 by bolts like 60. The movable member 57 is directly secured to the carriage 48 by bolts like 61 in a manner like that shown in FIG. 3. Since the members 58 and 59 are of the same material as the bed 45 there will be no tendency for temperature variations or for the members to shift on the bed. Likewise there will be no tendency for member 57 to shift on the carriage 48. Since the workpiece 52 is of material like the machine tool and members, the work may be performed at various temperatures without consequent error.

While the present invention provides a precision measuring transducer adapted to the machine tool so as to be free of temperature errors when fabricating a workpiece of material of the same temperature coefficient of expansion as the machine tool members and the transducer bases, workpieces may be fabricated with less error than heretofore, though having different coefficients.

Heretofore accurate transducers of the general type described herein have been made with silver or other metallic conductors on glass plates. Adherence of the conductor has been secured by vacuum deposition and the thickness acquired by electroplating. These processes are costly. The fabrication of the glass bases is also costly. The present invention utilizes metal for the bases which is less costly to fabricate than glass and a commercial metallic conducting sheet of appropriate thickness which is bonded to the base, avoiding vacuum deposition and plating. The metallic bases are more rugged, and less subject to breakage which is costly. Thus the present invention has a number of economic advantages over prior practice.

It is understood, in all cases, that the bases of the members are made of material which will rigidly maintain the form of the conductor arrays.

Various modifications may be made in this invention. For example, while the best results are secured by making the bases of the fixed and movable transducer members of the same material as their respective supports, as explained in connection with FIGS. 3, 5 and 6, the base of movable member 57 may be made of other material as, for example, glass, while retaining steel for the bases of the fixed members 58 and 59, in which case in improvement of sixty percent would result in the transformation ratio instead of 300 percent.

As a further modification, use may be made of the well-known methods for bonding sheets of copper or the like in printed circuits. The thickness of the copper winding may be of the order of substantially the range 0.0005" to 0.005".

The windings of the precision transducers herein described are of the type described and claimed in U.S. Patent No. 2,799,835, patented July 16, 1957, by R. W. Tripp et al., for Position Measuring Transformer.

When the properties of the bonding material are such that, in a layer of suitable thickness, due to its temperature coefficient of expansion, it exerts an undesired influence upon the length of the conductor array in the direction of relative motion, the bonding material is removed from between the conductor bars by additional etching.

This is performed with a suitable solvent which does not attack the base or conductors. For example, if the bonding material is a rubber composition, benzine or the like is used. If the bonding material is a glass composition, hydrofluoric acid is used. Additional applications of photo-resist and exposures may be made as necessary.

Referring to FIG. 7, this is a fragmentary longitudinal sectional view through one of members 57, 58 or 59 of FIGS. 5 and 6, where a single bonding material 62 is used; and after the conductor arrays 63, 64 and 65 are formed, by etching, the bonding material on the metallic base 66 adjacent to the conductor bars 63 and 64 and 64 and 65 has been removed by additional etching from spaces 67, 68, 69 and 70, as described, whereby the pattern of the bonding material is substantially the same as the pattern of the array of conductors.

I claim:

1. Precision electrical position measuring transformer apparatus comprising
   (a) two relatively movable rigid position measuring transformer members each having
   (b) a base of metal having,
   (c) a film-like layer of bonding and insulating material adhesively affixed to one surface thereof,
   (d) said layer of bonding and insulating material having a thickness of the order of .001 to .010 inch,
   (e) an electrical winding of a plurality of metallic conductors disposed side-by-side, extending transversely of the direction of relative motion of said members and connected in series for opposite directions of current flow in adjacent conductors, and having
   (f) a thickness of the order of .0005 to .005 inch, and
   (g) adhesively affixed to the surface of said bonding and insulating layer of each of said metal bases,
   (h) said thin bonding and insulating layer on each of said metal bases being adapted to maintain the said winding conductors and the said metal base in electrically insulated relation as a unit,
   (i) said windings being inductively coupled and having an inductive coupling characteristic of substantially sinusoidal form,
   (j) said electrical windings being secured to their respective metal bases in close and intimate relation therewith, thereby minimizing interference with the form of coupling wave between said windings,
   (k) the adhesive characteristics and the thinness of the film-like bonding and insulating layer and the metal and thinness of the conductor windings all being such that the position of the conductor windings changes in accordance with the changes in the surface length of the metal base produced by variations in ambient temperature,
   (l) said metal bases of said relatively movable members having substantially identical coefficients of expansion.

2. Precision electrical position measuring transformer apparatus according to claim 1 wherein each of said bases is of steel and said conductors are of copper.

3. Precision electrical position measuring transformer apparatus according to claim 1 for a machine tool for tooling a workpiece, said machine tool having
   (a) relatively movable machine parts,
   (b) one of said bases being a fixed base secured to the stationary one of said machine parts,
   (c) said bases being constituted of metallic material having a temperature coefficient of expansion substantially the same as that of said machine parts for reducing an error due to temperature variation,
   (d) said bases being mechanically secured directly and firmly respectively to the relatively movable machine parts in fixed position on their respective machine parts when subject to thermal expansion and contraction,
   (e) said fixed base being fixed to its machine part by spaced fastening means maintaining said fixed base in fixed position when subject to mechanical shock and vibration.

4. Precision electrical position measuring transformer apparatus comprising
   (a) a base member of magnetically permeable metal having
      (1) a film-like layer of bonding and insulating material adhesively affixed to one surface thereof,
      (2) said layer of bonding and insulating material having a thickness of the order of .001 to .010 inch,
   (b) an electrical winding of a plurality of metallic conductors disposed side-by-side and extending transversely of said base member and connected in series for opposite directions of current flow in adjacent conductors and having (c) a thickness of the order of .0005 to .005 inch, and having
(d) a coefficient of thermal expansion substantially different from that of said base,
(e) said winding being adhesively affixed to the surface of said bonding and insulating layer of said metal base,
(f) said thin bonding and insulating layer on said metal base being adapted to maintain the said winding conductors and the said metal base in electrically insulated relation as a unit,
(g) said electrical winding being secured to its metal base in close and intimate relation therewith, thereby minimizing interference with the form of coupling wave,
(h) the adhesive characteristics and the thinness of the film-like bonding and insulating layer and the metal and thinness of the conductor winding all being such that the position of the conductor winding changes in accordance with the changes in the surface length of the metal base produced by variations in ambient temperature,
  (1) with maintenance of the continuity of said layer, and
  (2) with adhesion of said conductor winding to said layer and adhesion of said layer to said metal base.
5. Precision electrical position measuring transformer apparatus according to claim 4, said bonding and insulating material having an intervening sheet of insulating material.

6. Precision electrical position measuring transformer apparatus according to claim 1, comprising,
(a) said bases being of ferromagnetic material,
(b) said transformer members and their said bases being relatively rotatable in the form of rotor and stator,
(c) a casing for said transformer members,
(d) a shaft in said casing,
(e) said bases having a temperature coefficient substantially the same as that of said casing and shaft,
(f) said stator base being directly fixed to said casing and
(g) said rotor base being directly fixed to said shaft.

References Cited by the Examiner

UNITED STATES PATENTS

| | | | |
|---|---|---|---|
| 2,650,352 | 7/53 | Childs | 336—129 X |
| 2,671,892 | 3/54 | Childs | 336—123 X |
| 2,689,805 | 9/54 | Croze-Hedrick | 117—65 |
| 2,759,854 | 8/56 | Kilby | 117—217 |
| 2,799,835 | 7/57 | Tripp | 336—30 |
| 2,879,415 | 3/59 | Wendt | 336—100 X |
| 2,911,605 | 11/59 | Wales | 336—200 |
| 2,915,721 | 12/59 | Farrand et al. | 336—69 |
| 2,942,212 | 6/60 | Mynall | 336—30 |

JOHN F. BURNS, *Primary Examiner.*

MILTON O. HIRSHFIELD, E. JAMES SAX, *Examiners.*